(No Model.)
N. W. GODFREY.
SCREEN.
No. 266,130.     Patented Oct. 17, 1882.
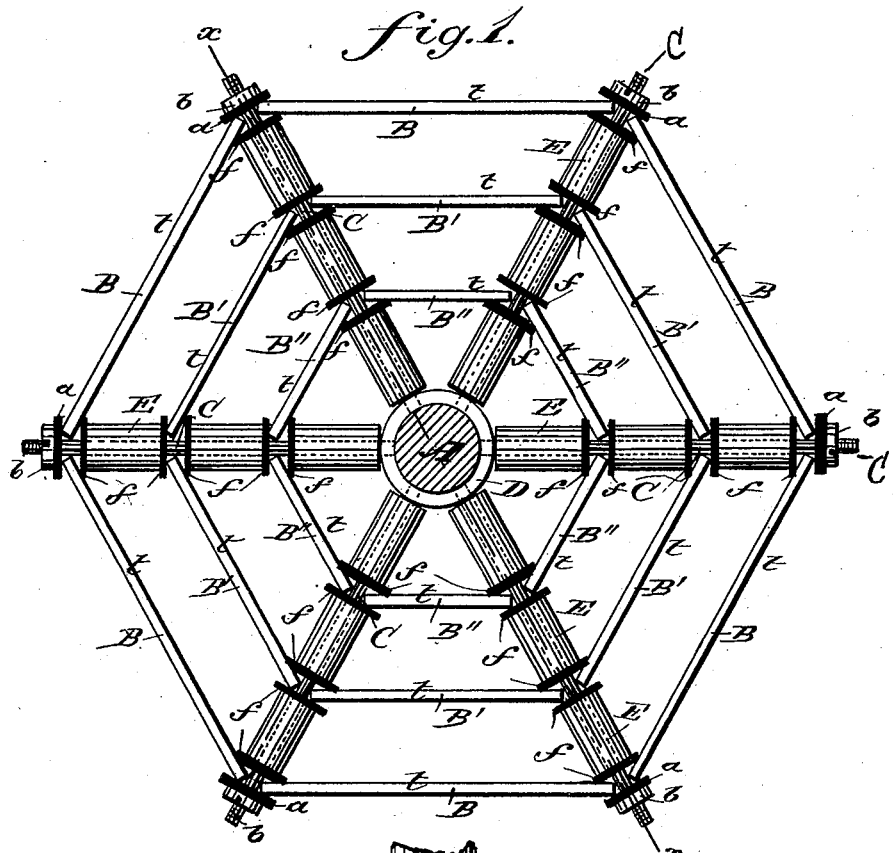
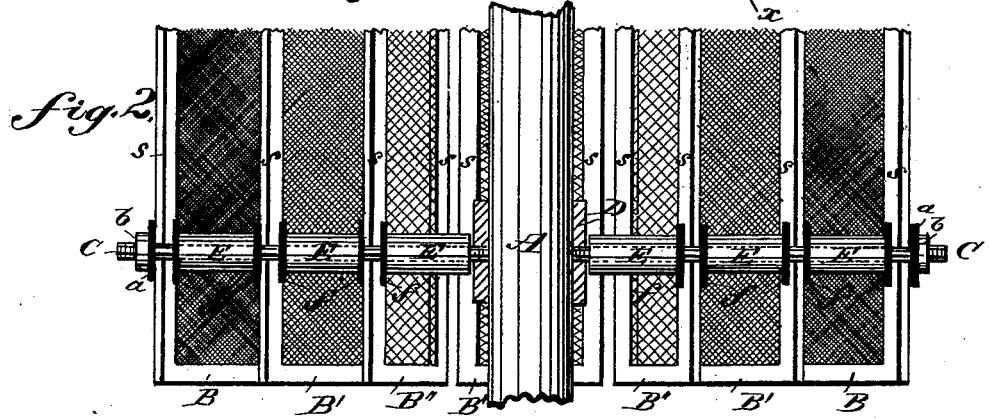
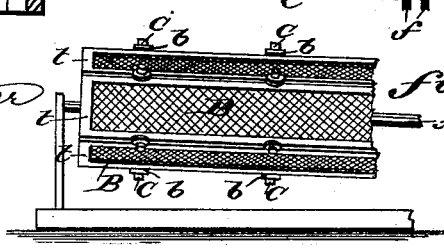
WITNESSES:     INVENTOR:

UNITED STATES PATENT OFFICE.

NICHOLAS W. GODFREY, OF BAYVILLE, NEW YORK.

SCREEN.

SPECIFICATION forming part of Letters Patent No. 266,130, dated October 17, 1882.

Application filed August 9, 1882. (No model.)

*To all whom it may concern:*

Be it known that I, NICHOLAS W. GODFREY, of Bayville, in the county of Queens and State of New York, have invented a new and useful Improvement in Screens, of which the following is a full, clear, and exact description.

My invention relates to certain improvements in revolving multiple screens, such as are used for separating sand or gravel into different grades, and seeks to provide a revolving multiple screen that can be easily taken apart for repairs or for replacing any of the screens when they become worn out.

Reference is to be had to the accompanying drawings, forming part of this specification, in which similar letters of reference indicate corresponding parts in all the figures.

Figure 1 is an end elevation of a revolving multiple screen built in accordance with my invention. Fig. 2 is a broken sectional elevation taken on the line $x\ x$ of Fig. 1. Fig. 3 is a broken side elevation of my new and improved screen. Fig. 4 is a sectional view of one of the radial rods and its pieces of gas-pipe removed from the screen, and Fig. 5 is a sectional elevation of one of the collars into which the radial arms are screwed.

A is the shaft. B B' B'' are the rectangular screens. C C are the radial rods, which are screwed into the collars D D, placed upon the shaft, and E E are the pieces of gas or similar pipe placed upon the said radial rods.

In the hexagonal form of screen shown the rectangular screens are made in sets of six, and there may be two, three, or more sets, according to the number of separations desired; and these set of screws will be of different sizes and different mesh—that is, the set B'' nearest the shaft will be smaller than the intermediate set, B', and the set B' will be smaller than the outer set, B, and the set of screens B'', which effect the first separation, is of coarser mesh than the screens B', and the latter are of coarser mesh than the screens B.

There will be several sets of the radial rods C C, a set at each end of the screens, and as many intermediate sets as are necessary to make the screens sufficiently rigid; and there will be as many sets of the pieces of gas-pipe E as there are sets of screens and sets of radial arms.

The manner of building up the screen is obvious from the drawings. After all the screens and pieces of gas-pipe, with the washers $f\ f$ at their ends, have been put in place, the washers $a$ and nuts $b$ are placed upon the outer ends of the radial rods, and the nuts are then screwed down, which tightens and binds the edges of the frames of the screens between the ends of the pieces of gas-pipe, and thus holds them firm and secure. Constructed in this manner it will be seen that by simply removing the nuts $b$ from the radial rods, the screen may be taken apart for repairs or for replacing any of the screens with new ones. Besides these advantages, the screen is cheap and very strong and durable.

Though I have shown in the drawings the screen-frames formed of the side bars, $s\ s$, and the end bars, $t\ t$, I wish it understood that the latter could be omitted, if desired.

Having thus described my invention, what I claim as new, and desire to secure by Letters Patent, is—

A rotary multiple screen having the central rotary shaft and screen-frames combined with and connected by collars D, threaded radial rods C, having washers $a\ f$, end nuts, $b$, and the short tubes or pipes E, substantially as shown and described.

NICHOLAS W. GODFREY.

Witnesses:
H. A. WEST,
C. SEDGWICK.